(12) United States Patent
Cox et al.

(10) Patent No.: US 9,226,546 B1
(45) Date of Patent: *Jan. 5, 2016

(54) SHOE BOTTOM HAVING INTERSPERSED MATERIALS

(71) Applicant: Seychelles Imports, LLC, El Segundo, CA (US)

(72) Inventors: Anthony Cox, Hong Kong (HK); John C. S. Koo, Los Angeles, CA (US)

(73) Assignee: Seychelles Imports, LLC, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,141

(22) Filed: Feb. 23, 2015

Related U.S. Application Data

(60) Continuation of application No. 14/064,123, filed on Oct. 26, 2013, now Pat. No. 8,984,769, which is a continuation of application No. 13/337,261, filed on Dec. 26, 2011, now Pat. No. 8,590,176, which is a (Continued)

(51) Int. Cl.
*A43B 13/12* (2006.01)
*A43B 13/14* (2006.01)

(Continued)

(52) U.S. Cl.
CPC .............. *A43B 13/14* (2013.01); *A43B 3/0078* (2013.01); *A43B 13/04* (2013.01); *A43B 13/08* (2013.01); *A43B 13/12* (2013.01); *A43B 13/122* (2013.01); *B29D 35/122* (2013.01); *B29D 35/142* (2013.01)

(58) Field of Classification Search
CPC ...... A43B 13/122; A43B 13/24; A43B 13/12; A43B 13/25; A43B 13/22; A43B 9/16; A43B 1/0063; A43B 3/0078; A43B 13/14; A43B 13/16; B29D 35/122; B29D 35/142; B29D 35/128; B29D 35/148
USPC ................. 36/25 R, 59 R, 59 C, 31; 12/146 B
See application file for complete search history.

(56) References Cited

U.S. PATENT DOCUMENTS

| 123,450 | A | 2/1872 | Bryant |
| 140,241 | A | 6/1873 | Bryant |

(Continued)

FOREIGN PATENT DOCUMENTS

| CN | 98234514.3 | 12/1999 |
| EP | 0516874 A1 | 12/1992 |

(Continued)

OTHER PUBLICATIONS

Prosecution history of parent U.S. Appl. No. 13/337,261 (now U.S. Pat. No. 8,590,176).

(Continued)

*Primary Examiner* — Ted Kavanaugh
(74) *Attorney, Agent, or Firm* — Joseph G. Swan, P.C.

(57) ABSTRACT

A shoe (and fabrication techniques therefor) on which is provided a bottom portion that includes a sole portion and a heel portion and that has a bottom surface and an upper portion extending upwardly from the bottom portion. The bottom surface of the bottom portion of the shoe has areas of a fabric material (such as cotton, nylon, polyester, any other cloth or fabric), or any of a variety of other first materials, interspersed with areas of a durable material (such as ethylene vinyl acetate, polyvinyl chloride, thermoplastic rubber, any other plastic, and/or any other natural or synthetic leather or rubber), or any of a variety of other second materials.

22 Claims, 11 Drawing Sheets

Related U.S. Application Data continuation of application No. 12/604,511, filed on Oct. 23, 2009, now Pat. No. 8,591,790, which is a division of application No. 11/684,311, filed on Mar. 9, 2007, now Pat. No. 7,700,021, which is a division of application No. 10/630,032, filed on Jul. 30, 2003, now Pat. No. 7,203,985.

(60) Provisional application No. 60/400,322, filed on Jul. 31, 2002.

(51) Int. Cl.
    *A43B 13/04*      (2006.01)
    *A43B 13/08*      (2006.01)
    *A43B 3/00*      (2006.01)
    *B29D 35/12*      (2010.01)
    *B29D 35/14*      (2010.01)

(56) References Cited

U.S. PATENT DOCUMENTS

| | | | |
|---|---|---|---|
| 1,524,997 | A | 2/1925 | Smith et al. |
| 1,811,803 | A | 6/1931 | Oakley |
| 2,287,282 | A | 6/1942 | Tousley |
| 2,371,689 | A | 11/1942 | Gregg et al. |
| 2,333,303 | A | 11/1943 | Enos |
| 2,400,487 | A | 5/1946 | Clark |
| 2,622,052 | A | 12/1952 | Chandler |
| 2,663,097 | A | 12/1953 | Giese |
| 3,007,205 | A | 11/1961 | House |
| 3,303,250 | A | 2/1967 | Bingham, Jr. |
| 3,698,357 | A | 10/1972 | Spencer |
| 3,776,753 | A | 12/1973 | Habib |
| 3,798,048 | A | 3/1974 | Brody et al. |
| 3,824,715 | A | 7/1974 | Vaughan, Jr. et al. |
| 3,888,026 | A | 6/1975 | Dassler |
| 4,055,699 | A | 10/1977 | Hsiung |
| 4,160,331 | A | 7/1979 | Bell |
| 4,250,306 | A | 2/1981 | Lask et al. |
| 4,356,643 | A | 11/1982 | Kester et al. |
| 4,497,871 | A | 2/1985 | Henke |
| 4,535,121 | A | 8/1985 | Oezelli et al. |
| 4,640,858 | A | 2/1987 | Barnett |
| 4,658,514 | A | 4/1987 | Shin |
| 4,779,360 | A | 10/1988 | Bible |
| 4,879,969 | A | 11/1989 | Haranoya et al. |
| 4,899,467 | A | 2/1990 | Mackey |
| 4,963,422 | A | 10/1990 | Katz et al. |
| 5,108,777 | A | 4/1992 | Laird |
| 5,290,607 | A | 3/1994 | Chitouras |
| 5,598,644 | A | 2/1997 | Polegato |
| 6,032,388 | A | 3/2000 | Fram |
| 6,106,920 | A | 8/2000 | Pichon et al. |
| 6,214,141 | B1 | 4/2001 | Kim et al. |
| 6,660,205 | B1 | 12/2003 | Harkins, Sr. |
| 6,900,547 | B2 | 5/2005 | Polk Jr. et al. |
| 8,984,769 | B1 * | 3/2015 | Cox et al. .............. 36/25 R |
| 2002/0035796 | A1 | 3/2002 | Knoche et al. |
| 2002/0157281 | A1 | 10/2002 | Safdeye et al. |
| 2002/0184793 | A1 | 12/2002 | Sato |
| 2003/0009919 | A1 | 1/2003 | Stein |
| 2003/0121179 | A1 | 7/2003 | Chen |
| 2003/0171049 | A1 | 9/2003 | Arnold et al. |
| 2004/0163190 | A1 | 8/2004 | Loughran |

FOREIGN PATENT DOCUMENTS

| | | | |
|---|---|---|---|
| GB | 2 201 082 | | 8/1988 |
| JP | S59-362 | | 1/1984 |
| JP | S61-225380 | | 10/1986 |
| JP | H3-170101 | | 7/1991 |
| JP | 2000308501 | | 11/2000 |

OTHER PUBLICATIONS

Prosecution history of parent U.S. Appl. No. 12/604,511 (now U.S. Pat. No. 8,591,790).

Prosecution history of parent U.S. Appl. No. 11/684,311 (now U.S. Pat. No. 7,700,021).

Prosecution history of parent U.S. Appl. No. 10/630,032 (now U.S. Pat. No. 7,203,985).

Prosecution history of parent U.S. Appl. No. 14/064,123 (now U.S. Pat. No. 8,984,769).

* cited by examiner

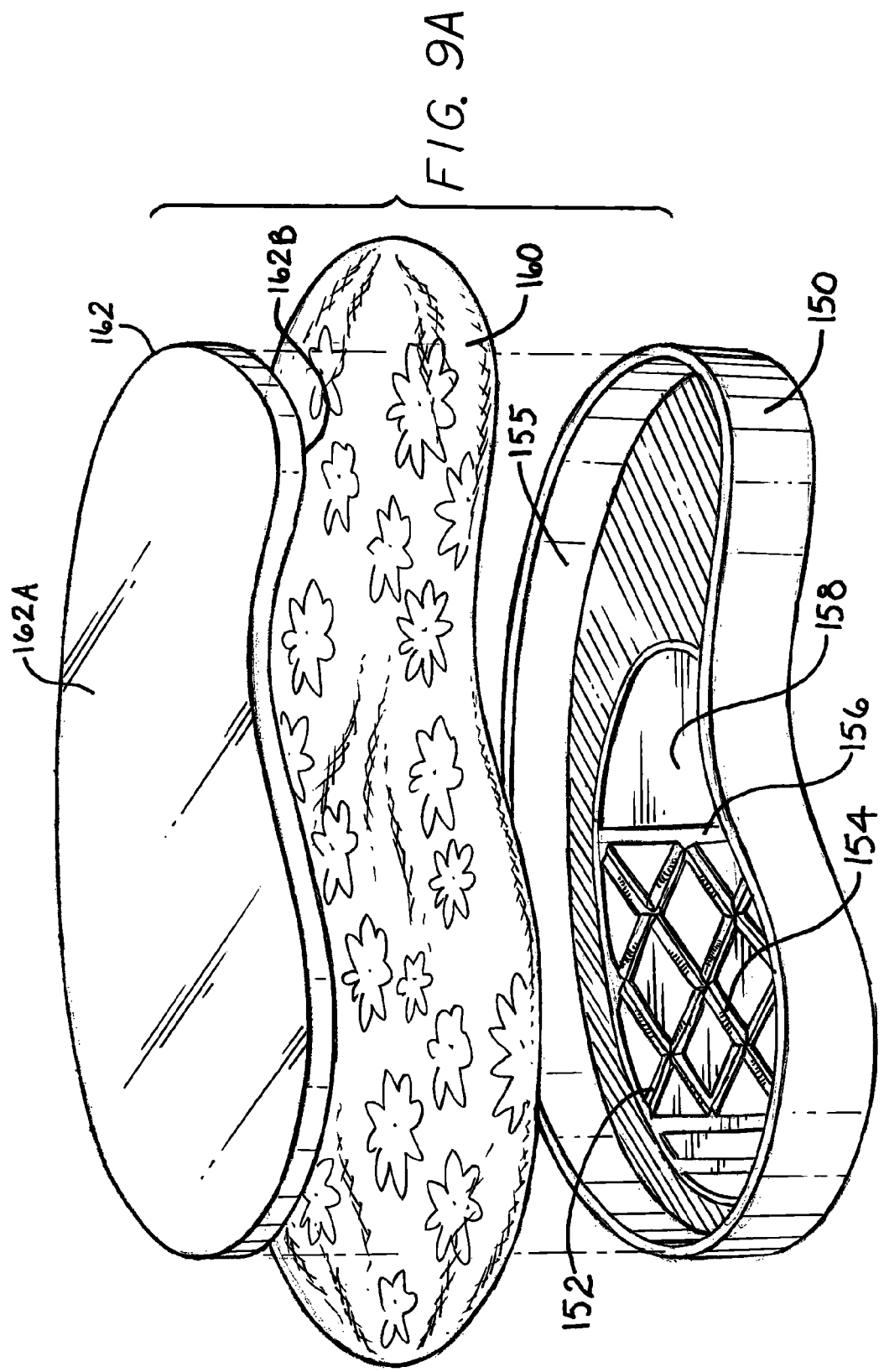

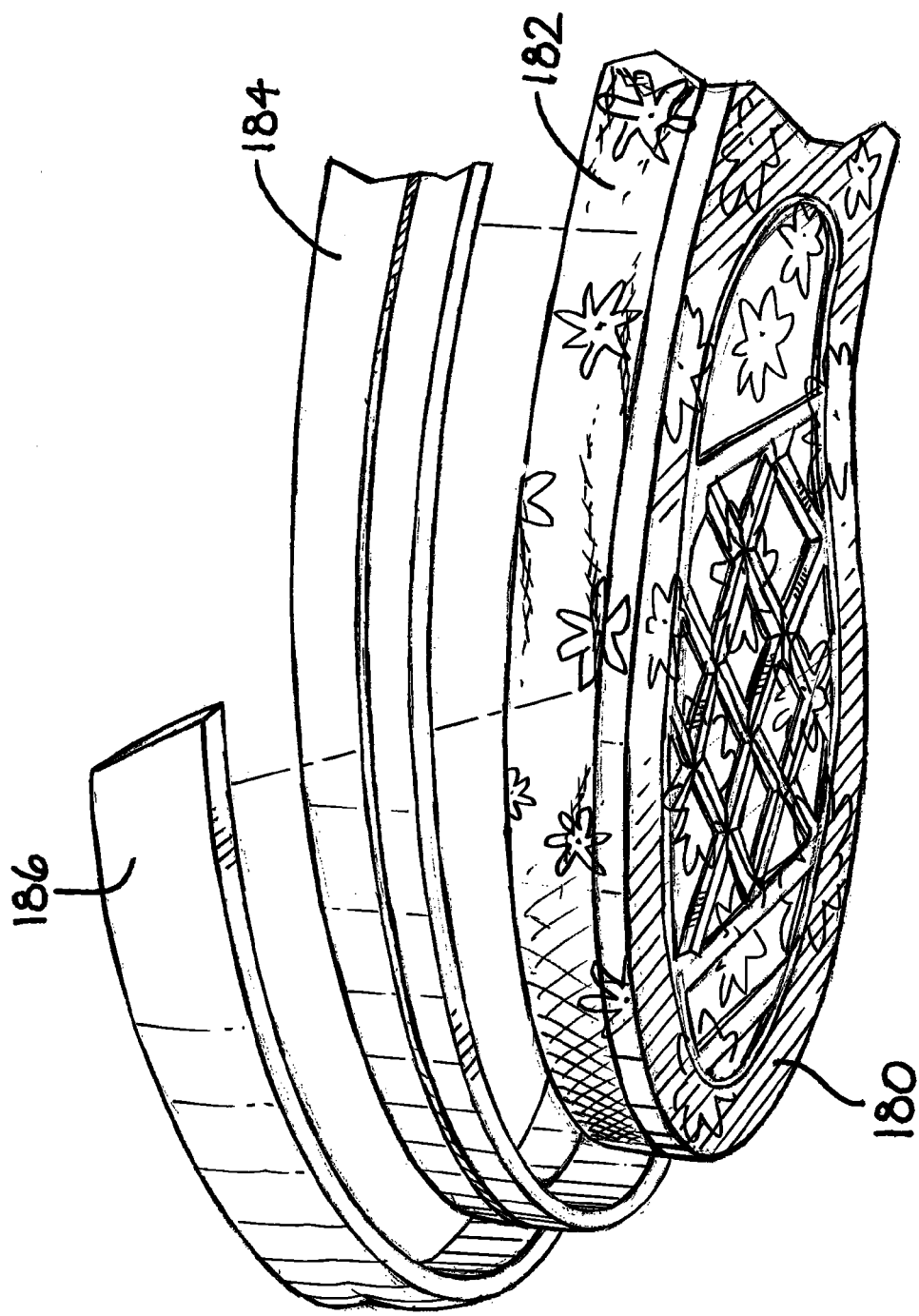

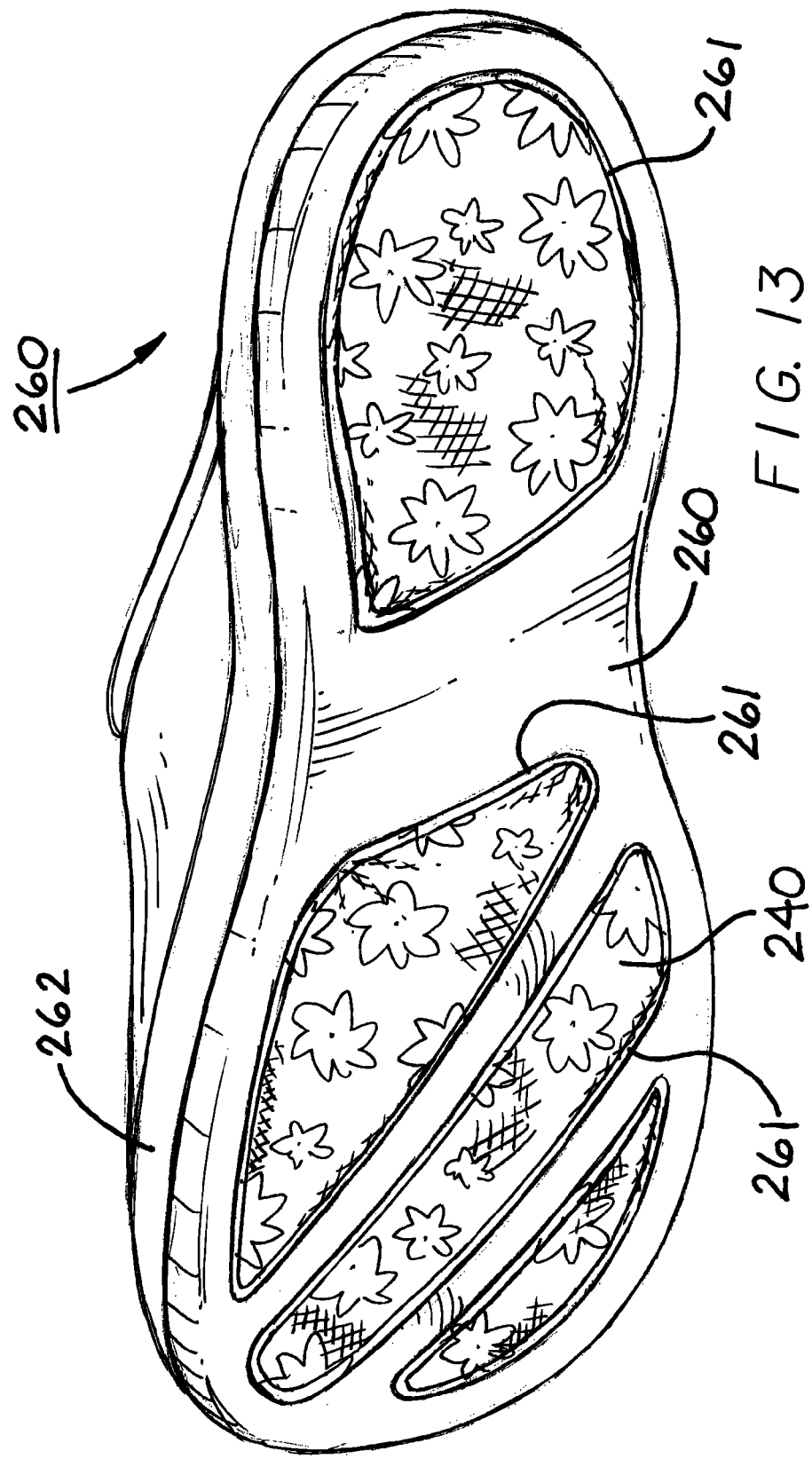

SHOE BOTTOM HAVING INTERSPERSED MATERIALS

This application is a continuation of U.S. patent application Ser. No. 14/064,123, filed on Oct. 26, 2013, which is a continuation of U.S. patent application Ser. No. 13/337,261, filed on Dec. 26, 2011 (now U.S. Pat. No. 8,590,176), which is a continuation of U.S. patent application Ser. No. 12/604,511, filed on Oct. 23, 2009 (now U.S. Pat. No. 8,591,790), which is a division of U.S. patent application Ser. No. 11/684,311, filed on Mar. 9, 2007 (now U.S. Pat. No. 7,700,021), which is a division of U.S. patent application Ser. No. 10/630,032, filed on Jul. 30, 2003 (now U.S. Pat. No. 7,203,985), which claimed priority to U.S. Provisional Patent Application Ser. No. 60/400,322, filed on Jul. 31, 2002, also titled "Shoe Bottom Having Interspersed Materials".

BACKGROUND OF THE INVENTION

1. Field of the Invention

The present invention concerns shoes and is particularly directed to shoe bottoms that are made from different, interspersed materials, as well as to techniques for manufacturing such shoe bottoms.

2. Description of the Related Art

Shoe manufacturers are continually looking for innovative design features to incorporate into their shoes. With regard to children's shoes, this often means a design feature that is capable of entertaining the child. In addition, the consumer often wants to be able to express some aspect of his or her personality through the styles of, and the designs upon, his or her apparel. Responding to these needs, for example, is commonly assigned U.S. patent application Ser. No. 09/268,412, filed Mar. 15, 1999 (the '412 Application), which describes a shoe and a corresponding technique in which removable tattoos can be applied to the shoe, and which application is incorporated by reference herein as though set forth herein in full. Nevertheless, there is an ongoing need for new and different designs to satisfy these desires.

SUMMARY OF THE INVENTION

The present invention addresses this need by providing a shoe having a bottom that is made from different, interspersed materials and by providing techniques for fabricating such a shoe. As an additional advantage, the inventors have discovered that certain of such shoes, provided that at least 50% of the ground-contacting portion of the bottom surface is a textile material, can qualify for a significantly lower United States tariff. See, e.g., chapter 64 of the Harmonized Tariff Schedule Of The United States (2003). Thus, in the preferred embodiments of the invention, sufficient textile materials (or other materials, as required by the tariff schedule) are used on the bottom ground-contacting surface of the shoe to qualify for lower tariff rates.

Thus, in one aspect the invention is directed to a shoe on which is provided a bottom portion that includes a sole portion and a heel portion and that has a bottom surface and an upper portion extending upwardly from the bottom portion. The bottom surface of the bottom portion of the shoe has areas of a fabric material (such as cotton, nylon, polyester, any other cloth or fabric) interspersed with areas of a durable material (such as ethylene vinyl acetate, polyvinyl chloride, thermoplastic rubber, any other plastic, and/or any other natural or synthetic leather or rubber) that is substantially more durable than the fabric material, where the fabric material covers at least 50% of the portion of the bottom surface that contacts the ground in normal use.

By virtue of this arrangement, a shoe according to the present invention can have a combination of properties that is not possible with conventional shoes, while at the same time qualifying for lower U.S. tariffs in certain cases. In addition, the use of such different materials can allow for unique aesthetic and tactile designs that are not possible with conventional shoes.

In another aspect, the invention is directed to a method for forming the bottom portion of a shoe, in which a piece of perforated material (such as cotton, nylon, polyester, any other cloth or fabric, or a soft natural or synthetic animal skin, canvas or suede) is placed into a mold for the bottom portion of the shoe and then a durable material (such as ethylene vinyl acetate, polyvinyl chloride, thermoplastic rubber, any other plastic, and/or any other natural or synthetic leather or rubber) is inserted into the mold on top of the perforated material. The durable material may be injected into the mold in liquid form or at least a portion of the durable material nearest to the perforated material may be melted after insertion into the mold. Finally, the durable material is made to harden into solid form.

The foregoing technique is capable of providing a shoe that has the advantages described above. In addition, such a technique can be relatively efficient and cost-effective to implement. In more particularized aspects, plural pieces of the fabric material are placed into the mold, the fabric material is more absorbent of water than the durable material, and/or the durable material when hardened is substantially more durable than the fabric material.

In a still further aspect, the invention is directed to a method for forming the bottom portion of a shoe, in which a piece of a first material is inserted into a mold for a bottom portion of a shoe, the mold having a surface pattern that includes sharp edges and/or points (e.g., resulting from abrupt angle changes that provide an apex). A second material is then inserted into the mold on top of the first material, where either: (i) the second material is injected into the mold in liquid form, or (ii) at least a portion of the second material nearest to the first material is caused to melt after insertion into the mold. Finally, the second material is made to harden into solid form. It is a feature of this aspect of the invention that the first material is forced into the mold so as to tear against the sharp edges and/or points.

The foregoing technique can be used to cost effectively manufacture shoe bottoms having interspersed materials, particularly materials that include a softer fabric material (or other material that has less elasticity) and a more durable material (e.g., one that has more elasticity or more fluid-like properties). In more particularized aspects, the first material is absorbent of the second material and therefore incorporates some of the color and physical properties (e.g., durability) of the second material, generally while still retaining its original imprinted design. As a result, for example, using a fabric material on the shoe (e.g., the sock bottom inside the shoe), or on an accompanying article, and the identical fabric material as the first material in manufacturing a shoe bottom, the design patterns for the two different areas of the shoe will match, while the colors may be complementary, and the textures and other physical properties can be quite different. As noted above, all of these advantages can be obtained using the efficient and cost-effective process recited above.

The foregoing summary is intended merely to provide a brief description of the general nature of the invention. A more complete understanding of the invention can be

BRIEF DESCRIPTION OF THE DRAWINGS

FIG. 9A illustrates an exploded perspective view of a shoe mold and pieces for forming a shoe bottom according to an alternate embodiment of the present invention.

FIG. 10 illustrates an exploded perspective view of a portion of a shoe according to an embodiment of the present invention.

FIG. 13 illustrates a bottom perspective view of a sample shoe manufactured using the process shown in FIG. 12.

DESCRIPTION OF THE PREFERRED EMBODIMENT(S)

Figure 1:
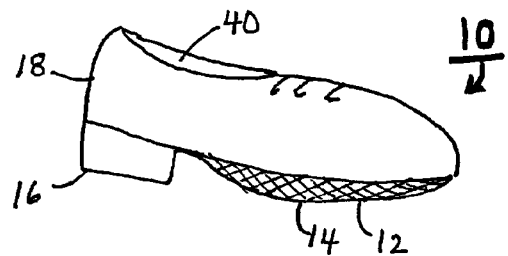
FIG. 1 is a perspective view of a shoe with separate heel and sole, according to a representative embodiment of the present invention.

FIG. 1 illustrates a perspective view of a shoe 10 according to a representative embodiment of the present invention. As shown in FIG. 1, shoe 10 includes a bottom portion that includes a sole 14 and a heel 16. Extending upwardly from bottom portion 12 is upper portion 18, which may be made of natural or synthetic leather, canvas or any other material from which conventional shoe uppers are made.

In the embodiment shown in FIG. 1, the sole 14 may be formed separately from heel 16 and then the two bonded together, such as by gluing. Alternatively, sole 14 and heel 16 may be integrally formed as a unitary piece, e.g., by injection molding or other known processes.

Figure 2:
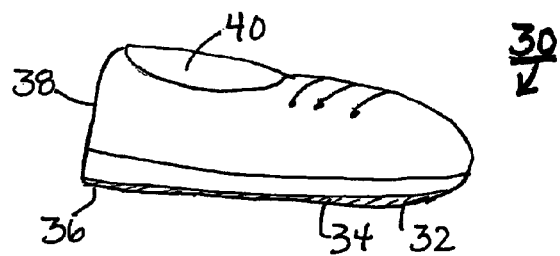
FIG. 2 is a perspective view of a flat-bottom shoe, according to a representative embodiment of the present invention.

FIG. 2 illustrates a perspective view of an alternative shoe 30 according to the present invention. As shown in FIG. 2, shoe 30 has a flat bottom 32 in which the heel portion 36 forms a part of, and is indistinguishable from (other than by reference to its location), sole portion 34. Upper portion 38 of shoe 30 is similar to upper portion 18.

It is noted that each of shoes 10 and 30 has an upper portion (18 and 38, respectively) that fully encloses the wearer's foot, and an opening through which the wearer may insert his foot. However, it is noted that shoes according to the present invention may have a more open upper portion, such as is common with sandals, thongs, clogs (or other open-back shoes) and open-toe or open-front shoes.

Figures 3, 4, 5:
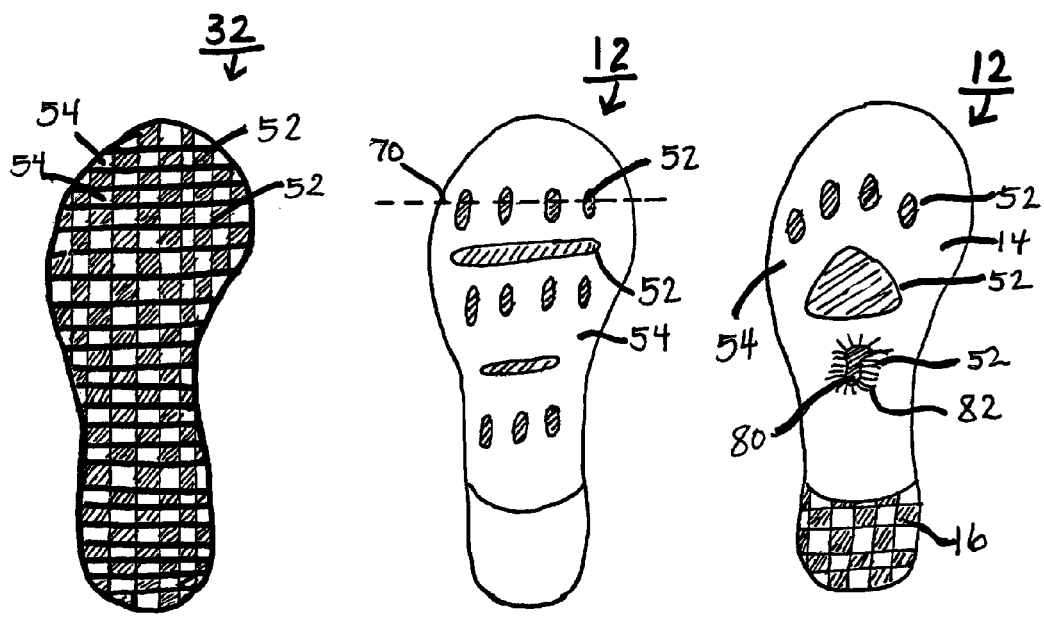
FIG. 3 is a bottom plan view of a shoe according to a first embodiment of the invention.
FIG. 4 is a bottom plan view of a shoe according to a second embodiment of the invention.
FIG. 5 is a bottom plan view of a shoe according to a third embodiment of the invention.
Figure 5B:
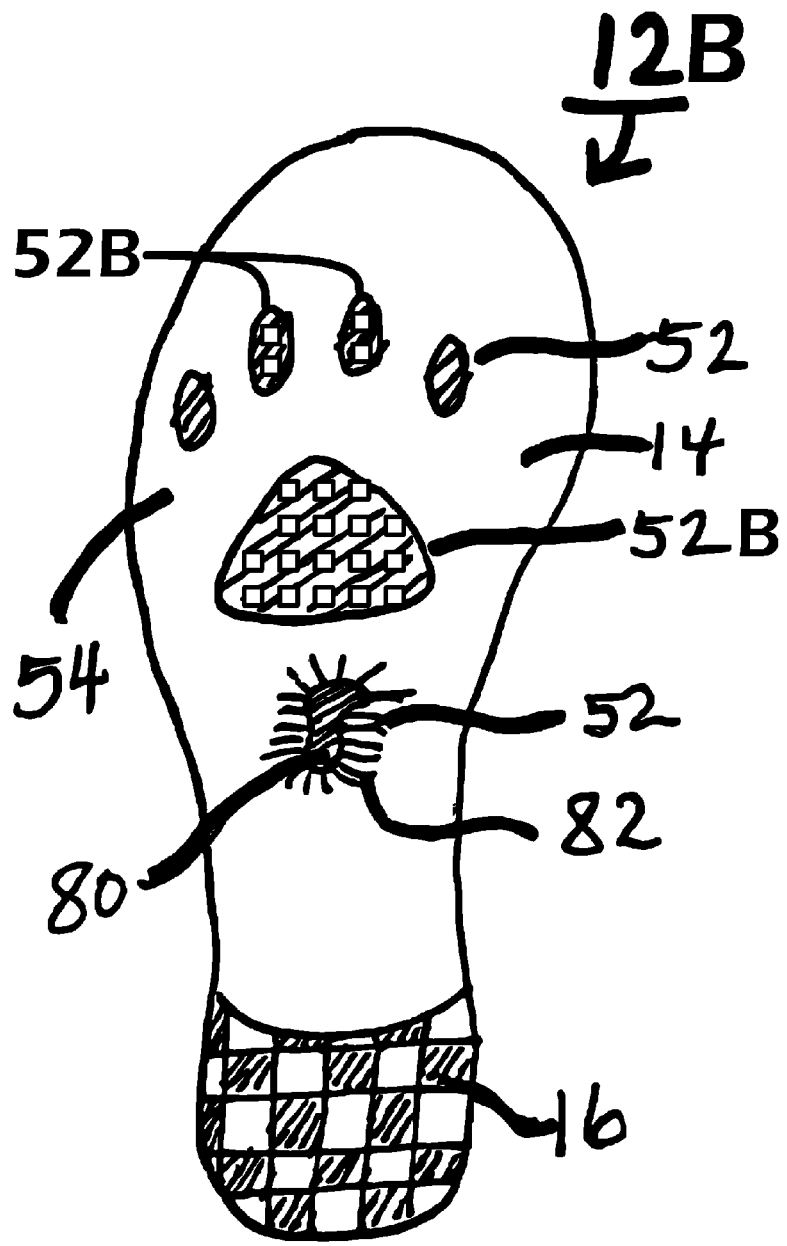

FIG. 3 illustrates a bottom plan view of shoe 30 according to a representative embodiment of the present invention. As shown in FIG. 3, the bottom portion 32 of shoe 30 is formed as a grid-like pattern using two different materials 52 and 54. In the preferred embodiment of the invention, material 52 is a fabric material, softer than material 54, while material 54 is more durable than material 52. The fabric material 52 preferably is obtainable in sheets and is a cloth or cloth-like material. Thus, for example, fabric material 52 may be, or may be comprised of, cotton, nylon, polyester, soft natural or synthetic animal skins, canvas, suede, or any other cloths or fabrics. Types of materials that may be used for durable material 54 include ethylene vinyl acetate (EVA), polyvinyl chloride (PVC), thermoplastic rubber (TPR), any other plastic, and/or any other natural or synthetic leather or rubber. As used herein, the term durable means resistance to wear. Preferably, material 54 is at least 2, 5, 7 or 10 times as durable as material 52.

In the pattern shown in FIG. 3 (as well as other design patterns in the preferred embodiments of the invention) the center-to-center spacing between any piece of material 52 and the adjacent (e.g., horizontally or vertically adjacent) piece of material 54 is less than 10 or 20 millimeters. More preferably, such center-to-center spacing is less than 5 or even 3 millimeters. However, any other spacing may instead be used. Thus, in other embodiments, the spacing may be greater than these distances.

FIG. 4 illustrates a bottom plan view of a shoe 10 according to a second representative embodiment of the present invention. As shown in FIG. 4, the design formed by materials 52 and 54 need not be regular and repeating, but instead may comprise any arbitrary design. However, in this configuration also the bottom surface of bottom portion 12 alternates between the materials 52 and 54. Thus, for example, in the current embodiment when traversing across the bottom surface of bottom portion 12 along an imaginary, appropriately selected straight line 70, the materials alternate 8 times between material 52 and material 54. Preferably, there exists one such straight line (and, more preferably, multiple such lines) where the materials alternate at least 4 times, 8 times, 12 times or 20 times. In other words, rather than one or two large sections of fabric material 52, the bottom surface of a shoe according to the present invention preferably has areas of material 52 interspersed with areas of material 54. It is noted that the patterns shown in the accompanying figures also may be produced in reverse (i.e., with the materials 52 and 54 switched) or in any other pattern. Similarly, the arrangement of materials 52 and 54 may be selected to enhance appearance, function or any combination of the two.

FIG. 4 also shows that the entire bottom portion of a shoe according to the present invention need not be formed from a combination of different materials. Rather, it is possible to use such a combination of different materials only for the outsole portion of the bottom of the shoe (as shown in FIG. 4), only for the portion of the sole that normally contacts the ground, only for the heel portion of the shoe, only for the portion of the entire bottom of the shoe that normally contacts the ground, or for any other portion of the bottom of the shoe.

FIG. 5 illustrates a still further embodiment of the present invention in which the bottom portion 12 of shoe 10 has an arbitrary design pattern of materials 52 and 54 on its sole 14 and a regular, repeating grid pattern of materials 52 and 54 on its heel 16. Thus, the design variations using materials 52 and 54 in an interspersed manner, as contemplated by the present invention, are virtually limitless, and may include any combination of regular repeating patterns (including grids) and arbitrary designs (including characters, letters and images). To some extent, the design pattern may depend upon whether the shoe is flat-bottomed or has a heel that is separate from the sole, as well as on other characteristics of the shoe.

Also shown in FIG. 5 is a piece 80 of fabric material 52 having frayed edges (e.g., extending threads of the fabric material 52) or other projections 82 from the main portion of piece 80. Such fraying or projections 82 preferably are at least 1 or 2 millimeters in length and may, in certain cases, allow for better attachment of material 52 to material 54. This may be seen more clearly in the discussion below concerning techniques for manufacturing a shoe bottom according to the present invention.

Figure 6:
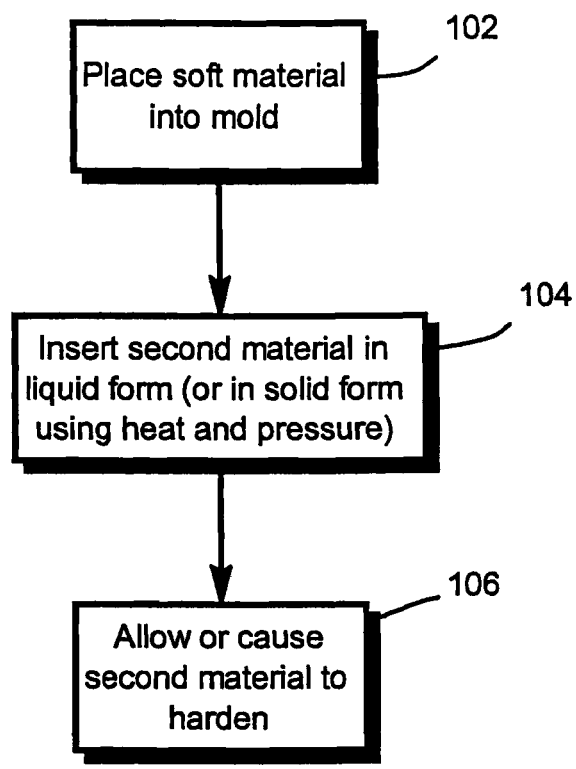
FIG. 6 is a flow diagram showing a method of manufacturing a shoe bottom according to a representative embodiment of the invention.

In this regard, FIG. 6 is a flow diagram illustrating a technique for manufacturing a bottom portion of a shoe according to a representative embodiment of the present invention. The following discussion of the manufacturing technique shown in FIG. 6 also references a mold 90, which is shown in FIGS. 7A through 7C.

Figure 7A:
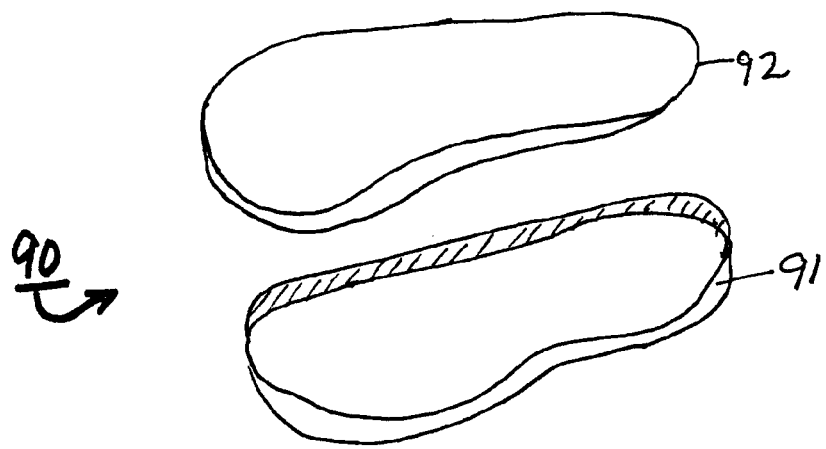
FIG. 7A illustrates a perspective view of the top and bottom sections of a mold for forming a shoe bottom according to a representative embodiment of the present invention.
Figure 7B:
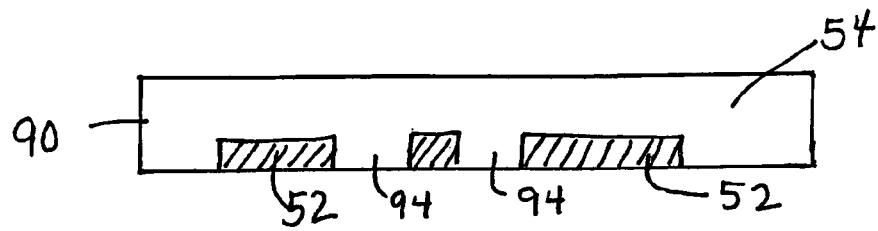
FIG. 7B illustrates a cross-sectional view of a mold, with a fabric material inserted and upon completion of injection, for forming a shoe bottom according to a representative embodiment of the present invention.
Figure 7C:
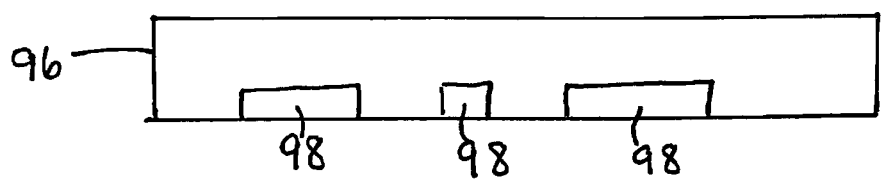
FIG. 7C illustrates a cross-sectional view of an alternate mold having indentations in its bottom surface.

As shown in FIG. 7A, mold 90 preferably consists of two sections, a lower section 91 and an upper section 92 that fit together. It is noted that mold 90 may be for forming only sole 14, only heel 16 or the entire bottom portion 12, including both sole 14 and heel 16. In the case of a flat-bottomed shoe 30, the mold will almost always be for forming the entire bottom portion 32 (or at least the outer layer of bottom portion 32, which may then be glued or otherwise bonded to other layers to form bottom portion 32), including both of portions 34 and 36. Still further, mold 90 may be used to form not only bottom portion 12, but some or all of the side portions of a shoe, and/or any other portions of the shoe.

Initially, in step 102 one or more pieces of fabric material 52 are placed into lower section 91 of mold 90. The fabric material 52 may be inserted into mold section 91 as a single piece. In this case, a single solid piece may be used. However, more preferably, such a single piece is perforated so as to have at least some (and preferably many) holes (or design pattern cutouts) through it. Thus, for example, one embodiment utilizes a single piece of material 52 that is sized and shaped so as to just fit within the mold section 91 (i.e., so as to conform to the bottom surface of mold section 91) and that has the grid-based perforations shown in FIG. 3. Alternatively, any other pattern of perforations may instead be used. Preferably, at least 5 or 10 such perforations are provided.

It is noted that the perforations referenced herein are intended to refer to holes that are visible to the naked eye, as opposed to pores in the fabric material 52 that can affect the properties of material 52 (e.g., ability to absorb liquid), but are not normally visible. Thus, such perforations typically will have a minimum dimension of at least 0.1, 0.2, 0.3, 0.5, 1, 2 or 4 millimeters, and may be made so as to achieve the spacing distances described above. In any event, it is preferable to use a relatively large number of small, but visible, closely spaced perforations. As indicated below, use of a material 52 that is porous also can have advantages, although this generally is viewed as an independent design choice from whether and where to include visible perforations.

Rather than a single piece of material 52, multiple different pieces of material 52 may be placed into mold section 91 during this step 102. Where multiple pieces of material 52 are to be placed in mold 90, the sizes, shapes and arrangements of such pieces may be arbitrarily selected by the designer, such as to form any of the patterns illustrated in FIGS. 4 and 5. Alternatively, such multiple pieces may be randomly inserted into mold 90 (e.g., by blowing such pieces into mold 90). It should also be noted that where multiple pieces of material 52 are to be used, any or all of such pieces may be perforated, as described above, and may have the same or different colors, designs and/or shapes. It may also be preferable to utilize a conventional tacky substance in order to hold such multiple pieces in the desired pattern on the bottom surface of mold section 91.

Regardless of whether a single piece or multiple pieces of material 52 are used, the edges of each such piece may be smooth and continuous (such as the pieces shown in FIG. 4) or may have frayed edges or multiple projections (such as piece 80 shown in FIG. 5). Providing such fraying or projections may allow the material 52 to attach more integrally to material 54 by allowing greater surface area contact between materials 52 and 54, as indicated below.

Returning to FIG. 6, in step 104 material 54 is inserted into mold 90 in liquid (or slurry) form, although as indicated in the embodiments described below it may instead be inserted in solid (e.g., flexible solid) form. This step can be performed by placing cover 92 on lower section 91 and then injecting material 54 into mold 90 (or by using pressure and heat to form material 54 in the event it has been inserted in solid form). As a result of this step, the material 54 fills in, around and between: any perforations in the pieces of material 52, any fraying or projections 82, and any spaces between the different pieces of material 52. This result is illustrated in FIG. 7B, which depicts a cross-sectional view of mold 90 upon completion of step 104. The gaps 94 between different areas of material 52 may be the result of perforations in a single piece of material 52 and/or may be gaps between different pieces of material 52.

Returning again to FIG. 6, in step 106 the material 54 is allowed (or caused) to harden. Generally, this step will merely involve allowing material 54 to cool. However, depending on the type of material 54, any other known steps may be taken to induce the hardening of material 54.

As shown in FIG. 7B, upon completion of the process, pieces 52 extend from the bottom surface of the bottom portion of the shoe up through a significant portion of the depth of the bottom portion of the shoe. In certain embodiments of the invention, the pieces of material 52 extend substantially through the usable portion of the bottom portion of the shoe. As a result, as the bottom portion of the shoe wears over time, the bottom surface of the shoe continues to have both areas made of material 52 and areas made of material 54.

Figure 8:
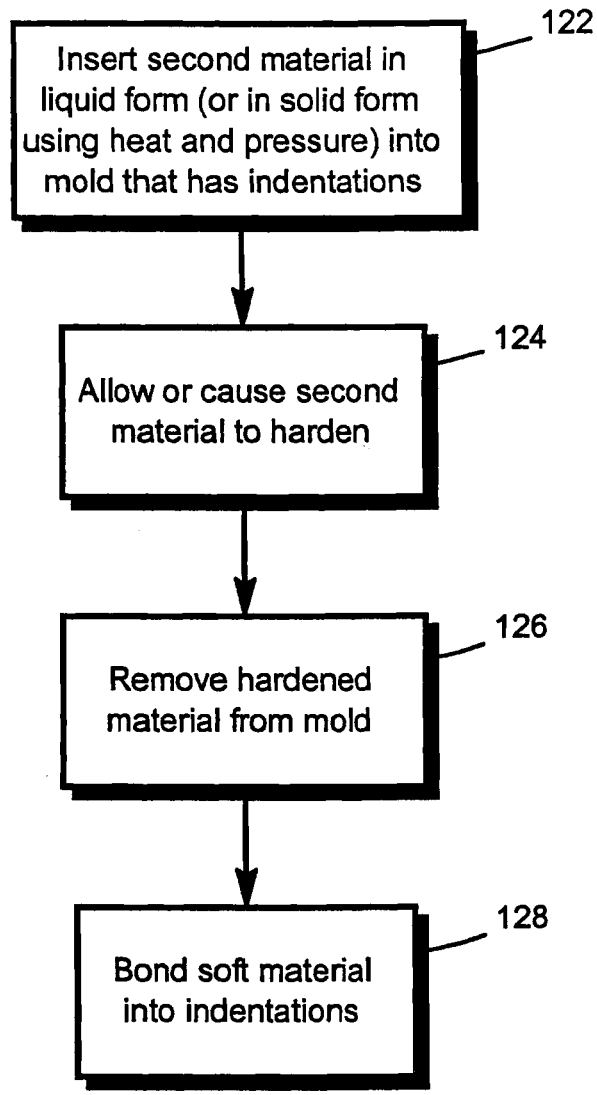
FIG. 8 is a flow diagram showing an alternate method for manufacturing a shoe bottom according to the present invention.

FIG. 8 illustrates an alternate technique for manufacturing the bottom portion of a shoe according to the present invention. In this technique, a mold is again utilized, but rather than having a smooth bottom surface, the mold used in this alternate technique has indentations in its bottom surface. This is illustrated in FIG. 7C which shows a cross-sectional view of alternate mold 96 having indentations 98 in its bottom surface. Such indentations may be in the pattern shown in any of FIGS. 3 to 5, with the indented areas being where the material 52 is to be placed.

In step 122, the material 54 is inserted into mold 96 in liquid form. This step may be performed by simply injecting material 54 into mold 96. Alternatively, material 54 instead may be inserted in solid (e.g., a flexible solid) form, with heat and pressure applied to form it.

In step 124, the material 54 is allowed to (or caused to) harden. Once again, this step generally will involve merely allowing material 54 to cool.

In step 126, the hardened material 54 is removed from mold 96. Then, the softer material 52 is bonded into at least some of the indentations 98 in the resulting shoe bottom. Such bonding may be performed by gluing, stitching or any other known technique.

In the preferred embodiment of the invention, the thickness of material 52 bonded into indentations 98 is approximately the same as the depth of indentations 98, so that the areas of the bottom surface of the shoe comprised of material 54 will contact the ground at the same time as the areas comprised of material 52. Once again, pieces of material 52 may extend from the bottom surface of the bottom portion of the shoe up through a significant portion of the depth of the bottom portion of the shoe. In such embodiments of the invention, the pieces of material 52 extend substantially through the usable portion of the bottom portion of the shoe. As a result, as the bottom portion of the shoe wears over time, the bottom surface of the shoe continues to have both areas made of material 52 and areas made of material 54.

It is noted that the material 52 may be bonded in multiple different pieces. Alternatively, a single piece of material 52, shaped and perforated into a pattern that matches indentations 98, may be bonded at once to the formed piece of material 54. Still further, any combination of these options may be employed.

Once the bottom portion of the shoe (or any portion thereof) has been manufactured, any other pieces of the bottom portion (e.g., the heel if not already formed) are attached and then the upper portion of the shoe is attached. These steps may be performed in the conventional manner, e.g., by stitching or gluing.

Figure 9B:
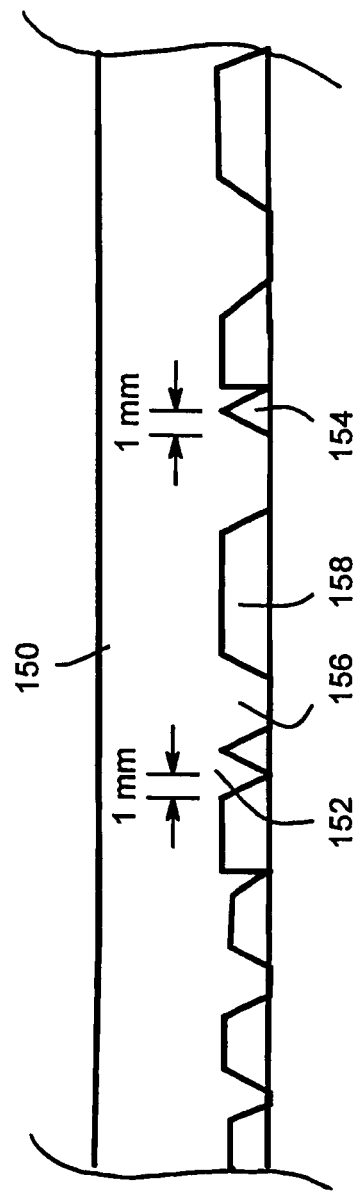
FIG. 9B, illustrates a cross-sectional view of a portion of the shoe bottom mold shown in FIG. 9A.

FIG. 9A illustrates an exploded view of a shoe mold 150 and pieces 160 and 162 for forming a shoe bottom 12 according to an alternate embodiment of the present invention. In this embodiment, mold 150 has sharp or pointed indentions 152 and sharp or pointed upward protrusions 154 (or angles that result in an apex) in its bottom surface. In this regard, the word "sharp" generally means closely spaced (e.g., spaced less than approximately 1 millimeter apart) indentation/protrusion edges, having sharp edges and/or corners, and/or having similar characteristics that would cause a subject material to break and/or tear. This can be seen more clearly in FIG. 9B, which illustrates a cross-sectional view of a portion of mold 150. In addition, mold 150 may also have blunter indentations 156 and blunter protrusions 158 in its bottom surface.

Initially, a piece 160 of fabric material 52 is placed into mold 150. As seen in FIG. 9A, piece 160 is approximately the same shape as mold 150, but preferably is larger than mold 150. As a result, after placement into mold 150, some of material 52 will extend upwardly along the sides 155 of mold 150.

Upon completion of such placement, a piece 162 of solid material 54 (e.g., formed using an injection molding process), having approximately the same size and shape as mold 150, is placed into mold 150. More specifically, piece 162 is inserted into mold 150 using heat and pressure. The heat may be applied to top side 162A or to the bottom side 162B of piece 162 and, for example, may be applied by heating the mold 150.

The applied pressure forces piece 162, and accordingly piece 160 as well, to conform to the three-dimensional pattern of the bottom of mold 150. In addition, because such three-dimensional pattern includes sharp indentations 152 and sharp protrusions 154 (e.g., having sharp edges, corners and angles), in certain places the fabric material 52 comprising piece 160 tears or breaks. At the same time, the applied heat causes the bottom surface 162B of piece 162 to partially melt, having the effects of: (i) more closely forming piece 162 to the shape of mold 150 and (ii) bonding piece 162 to piece 160. In certain embodiments, the applied heat may also facilitate the tearing or breaking of piece 160.

Upon completion of the foregoing steps, piece 162 is allowed to cool and the combination of pieces 160 and 162 is removed from mold 150. Where piece 160 broke or tore, the material 54 forming piece 160 will have penetrated through to the bottom surface of mold 150. As a result, the finished product will have interspersed areas of material 52 and material 54. In addition, and as noted above, the partial melting of piece 162 during production results in a strong bond between piece 162 and piece 160.

This technique for producing interspersed areas of two different materials can be quite cost-effective, as it requires only a couple of simple steps. At the same time, it can provide all of the advantages described above for using interspersed materials, e.g., materials 52 and 54. Also, the breaking of the material 52 during the manufacturing process can produce a significantly different aesthetic effect than simply perforating the material 52 prior to use.

By imprinting piece 160 with a multi-color (i.e., more than one color) design, such a technique also can allow for unique design expressions. However, even using a piece 160 that is a single color, but a color that is different than the color of piece 162, can provide for design opportunities that are not available with most conventional techniques. This is due to the fact that the breaking of piece 160 necessarily also will cause the two different colors to be interspersed on the bottom of the resulting shoe. In any case, once the design of mold 150, color(s) of piece 160, design pattern of piece 160 (if any) and color of piece 162 are determined, the manufacturing process is relatively simple, translating into a low marginal cost of production.

Other variations of this embodiment of the invention also are possible. For instance, piece 162 also may have been formed so as to have a multi-color design, thereby adding to the design opportunities for the resulting shoe bottom. In addition, rather than using a solid piece 162, material 54 may be injected into a sealed mold 150 in a liquid (or slurry) form, although use of a solid piece is believed to better facilitate breaking or tearing of piece 160. Still further, rather than using a single piece 160, multiple pieces may instead be used (e.g., sprayed or simply dropped into the bottom of mold 150), with the result being a unique appearance for each shoe and/or pair of shoes. If multiple pieces 160 are used, the different pieces may be of different materials and/or different colors, and/or may have different patterns imprinted on them.

Also, piece 160 (or some or all of such pieces of more than one is used) may be formed of a material other than a fabric material 52, such as a plastic. Preferably, any material used is brittle (or non-flexible or non-stretchable) enough to break or tear at certain points when the subject pressure is applied. Other properties of the material used for piece 162 may be selected to achieve desired results, as follows.

Depending upon the absorbency characteristics of piece 160, the properties of the resulting shoe bottom will differ. If piece 160 is highly absorbent (e.g., very porous), then in addition to flowing into the openings created by the tears and breaks in piece 160, the material 54 that comprises piece 162 also will penetrate into piece 160 itself, generally making the exposed portions of piece 160 much more durable and more like material 54 itself, while still retaining the design pattern originally imprinted onto piece 160. However, a change in the appearance of the exposed portions of piece 160 typically will result, due to the coloring effects of the material 54. On the other hand, if piece 160 is not very absorbent, the exposed portions of piece 160 will retain more of their original properties (e.g., will be more fabric-like and retain will retain their original colors more closely). Thus, the choice of the specific material to use for piece 160 provides additional flexibility in designing the resulting shoe bottom.

Still further, piece 160 may be made of a material (such as plastic) that melts when exposed to the heat and pressure of the foregoing process, rather than tearing or breaking. As a result, the color of piece 160 and the pattern (if any) imprinted thereon will blend into piece 162 and therefore be seen on the shoe outsole (or other portion of the shoe being formed using this process).

The dispersion pattern of the materials forming pieces 160 and 162 can be calculated mathematically based on the elasticity of the material for piece 160, the density of the material for piece 162 relative to the material of piece 160, the contact surface area between pieces 160 and 162, the coefficient of friction between such pieces, the amount of applied pressure, the process temperature, and/or the absorption factor for piece 160. As a result, desired material patterns and bottom surface area percentages can be achieved.

A piece 180 that may be produced in accordance with the foregoing technique is shown in FIG. 10. As described above, a portion 182 of the piece 160 extends upwardly along the edge of piece 180. Therefore, when foxing 184 is glued around the edge of piece 180, this portion 182 of piece 160 acts as an anchor. Optionally, a toe bumper 186 also may be glued on top of a portion of foxing 184.

Figure 11:
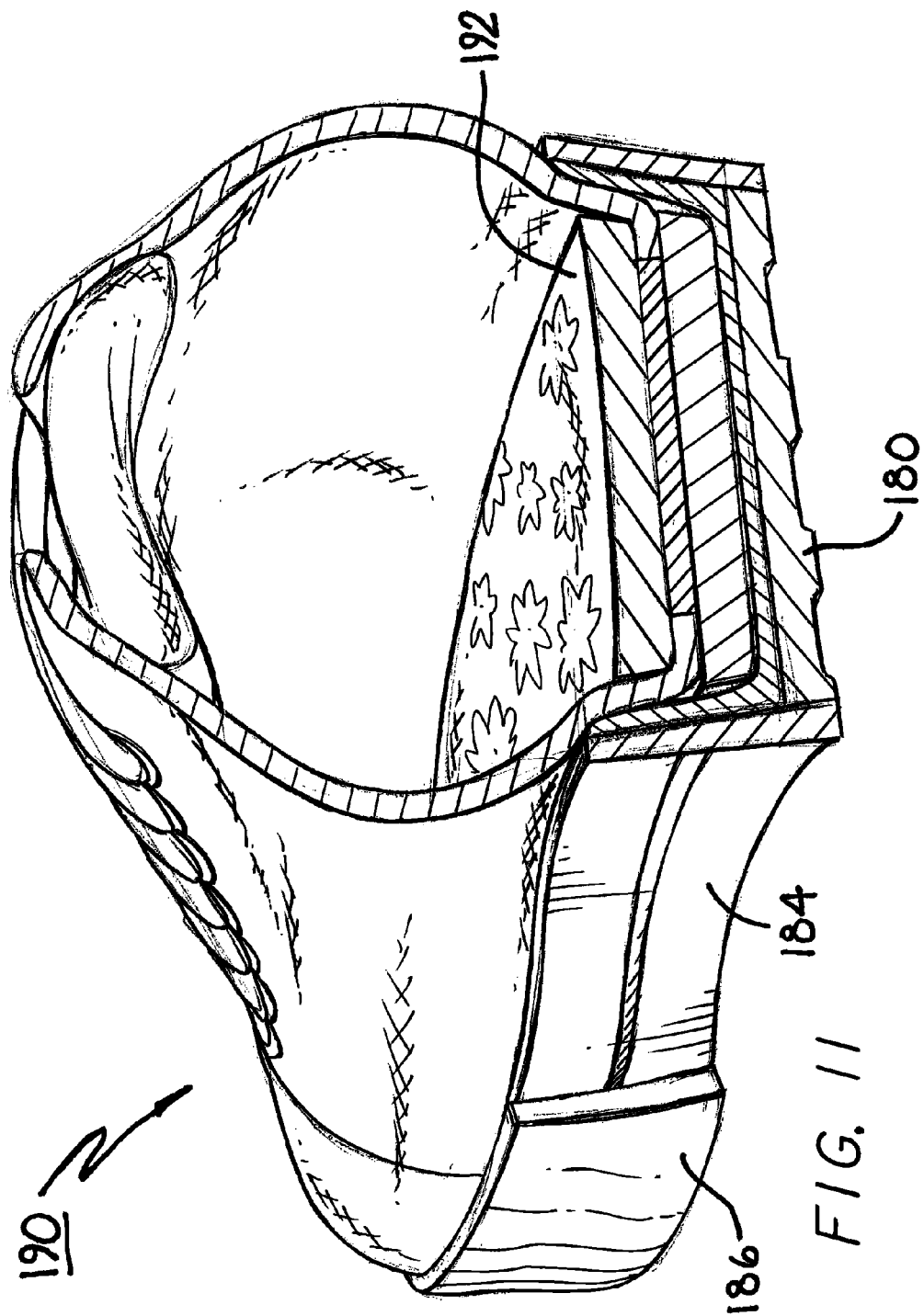
FIG. 11 illustrates a cutaway perspective view of a shoe according to a representative embodiment of the present invention.

FIG. 11 illustrates a cutaway perspective view of a shoe 190 formed using bottom portion 180. In one embodiment of the invention, shoe 190 has a sock bottom 192 (i.e., where the wearer's foot would rest when wearing shoe 190) that has a pattern imprinted thereon that is identical to the pattern imprinted on piece 160. In fact, sock bottom 192 can be of the same material as piece 160. Visually, however, the appearance of sock bottom 192 generally will differ from the appearance of shoe bottom 180 due to the liquid absorbency of piece 160 (as described above), the color of piece 162, and the spaces between the exposed portions of piece 160 (caused by the tearing of piece 160) that have been filled in by the material 54. In short, using the same material for piece 160 and sock bottom 192 can provide either identical or else complementary appearances for different portions of a shoe.

Rather than using identical designs and colors for the materials used for sock bottom 192 and piece 160, alternate embodiments may use similar and/or complementary designs and/or colors. The specific choices will depend upon the desired aesthetic effect for the final product. Also, the sock bottom itself may be formed by injection molding, e.g., in the same manner described above for shoe bottom 180.

Similar complementary color and/or pattern matching can be made with other portions of the resulting shoe 190 in the above manner. When this is the desired effect, it generally is preferable to use white or light color for material 54, in order to provide just a slight variation as compared to those areas of shoe 190 which are covered in the same fabric or other material as is used for piece 160.

It is noted that the foregoing technique need not be restricted to the manufacture of shoe bottoms, but can be used to produce any other portion of a shoe or any other article. As indicated above, it is particularly applicable where pattern matching is desired, either within the same article (e.g., different portions of a shoe) or for matching separate articles (e.g., matching a portion of a shoe to a purse). In each such case, the same pattern or similar patterns may be used on different exposed areas, with the physical properties varied by changing the liquid absorbency of the fabric material (or other material used) or by changing process parameters (such as temperature, pressure or process speed) that affect the actual amount of material 54 that is absorbed by piece 160.

Figure 12:
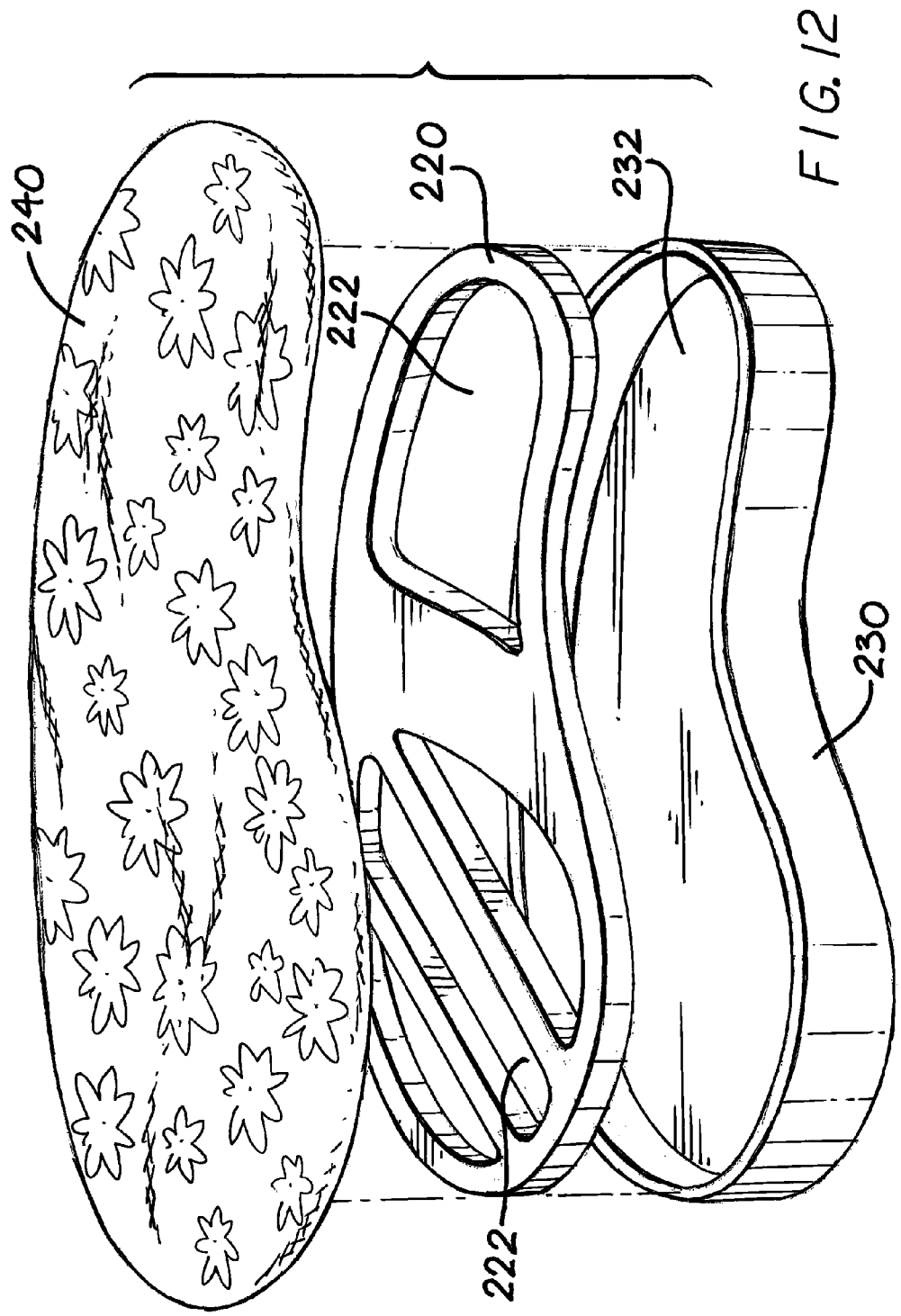
FIG. 12 illustrates an exploded perspective view of the components for manufacturing a shoe bottom according to a further embodiment of the present invention.

FIG. 12 illustrates an exploded view of the components for manufacturing a shoe bottom according to a still further embodiment of the present invention. In this embodiment, a skeleton 220 is formed (e.g., by injection molding a durable material 54) and then is placed as a solid finished piece into an injection mold 230. As shown in FIG. 12, skeleton 220 includes openings 222 and has been formed so as to just fit within mold 230. Thus, both the interior of skeleton 220 and mold 230 are approximately the same size and shape, although skeleton 220 is not as thick as mold 230 is deep. Skeleton 220 and mold 230 may have either flat or contoured bottoms. Similarly, although mold 230 is shown in FIG. 12 as having a smooth bottom surface 232, it may instead have a pattern of indentations that match the pattern of openings 222 in skeleton 220, so as to facilitate the placement of skeleton 220 into mold 230.

There may be just a few openings 222 of varying sizes in skeleton 220, as shown in FIG. 12. Alternatively, the openings 222 may be smaller, more numerous and/or more regularly sized, shaped and/or arranged (e.g., using the grid pattern discussed above).

After placement of skeleton 220 into mold 230, a piece 240 of fabric material 52 is placed into mold 230. Piece 240 may be approximately the same size as skeleton 220 and the interior of mold 230 or, as shown in FIG. 12, may be larger. In the latter case, portions of piece 240 will extend upwardly along the inner walls of mold 230, as in the embodiment described above, and thus is more appropriate where separate foxing is to be used in constructing the shoe. In either case, piece 240 is approximately the same shape as skeleton 220 and mold 230.

After placement of piece 240, mold 230 is closed and a durable material 54 is injected therein. The injected material 54 may be identical to the material from which skeleton 220 is formed, although preferably skeleton 220 has a different color than the injected material. The pressure from the injection process forces portions of piece 240 through the openings 222 so as to come into contact with the bottom surface of mold 230.

Alternatively, material 54 may be inserted in a solid (e.g., flexible solid) form, with heat and pressure being used to shape such material 54 around piece 240 and through openings 222. This alternative embodiment may be particularly advantageous in situations where skeleton 220 is made from a material other than material 54 (e.g., a material having a higher melting point than material 54).

In addition, the heat of the injected material causes the surface of skeleton 220 that comes into contact with piece 240 to soften or melt slightly. As a result, when the entire piece is allowed to cool and is removed from mold 230 skeleton 220 bonds to piece 240.

The material may be injected into mold 230 from the top side, i.e., the side adjacent to fabric material piece 240 if the bottom portion of the shoe is to be manufactured as a separate piece. On the other hand, by including one or more holes in the bottom surface 232 of mold 230, underneath corresponding openings 222, and aligned holes in fabric material piece 240, the material may be injected from the top side. One advantage of this latter embodiment is that the bottom portion of the shoe can be formed and simultaneously attached to the upper portion. In this embodiment, rather than using a separate cover for the top of mold 230, the upper portion of the shoe (having been separately manufactured) is inserted and pressed into the top opening (e.g., using a weight inserted into the upper portion). Then, when the material is injected, in addition to forcing the fabric material piece 240 against the bottom surface 232 of mold 230, the injected material also is forced up and around the lower areas of the upper portion of the shoe, thereby forming the bond between the lower and upper portions of the shoe.

FIG. 13 illustrates a bottom perspective view of a sample shoe 260 manufactured using the process shown in FIG. 12 and discussed above. As seen in FIG. 13, the bottom portion of shoe 260 has alternating areas of piece 240 (which preferably is made of a fabric material 52) and more durable material 54 which was used to form skeleton 220. A result of the process described above is that often there will be a gap 261 in the bottom surface of the shoe 260 between the exposed portions of piece 240 and skeleton 220.

As shown in FIG. 13, fabric material piece 240 is imprinted with a multi-color design, which may be matched to (e.g., identical to or complementary to) fabric used on another portion of shoe 260 or any other article (e.g., a matching article sold and/or worn with shoe 260). The material 54 that was injected into mold 230 is only visible as the upper portion 262 of the sidewall for shoe 260. However, such material also is disposed beneath the piece 240. In the present embodiment, skeleton 220 is gray and upper sidewall portion 262 is white, although other color combinations may instead be used.

An advantage of providing a shoe having interspersed materials, as described above, is that the wearer obtains the advantages of two different types of materials. For example, one type of material might have better grip in some circumstances while the other has better grip in others. The foregoing techniques for manufacturing such a shoe (or shoe bottom) can achieve these advantages in a highly cost-effective manner.

Additional Considerations.

In the embodiments described above, the two different types of materials have different levels of durability and softness. As a result, the appearance and tactile properties experienced by the wearer of a shoe according to the present invention often will be markedly different that those of conventional shoes, providing the possibility of additional design choices that are not available with conventional shoes. In a variation of the above embodiments, the softer material also is more water-absorbent than the more durable material, thus creating a novelty shoe in which the wearer, after walking through a puddle of water or other liquid or semi-liquid substance (e.g., dyed water) can make different prints that would be possible with conventional shoes.

Also, in the embodiments described above two different types of materials are used on the bottom surface of the bottom portion of a shoe. However, the present invention is not limited to two different types of materials. Rather, the techniques and concepts described herein may also be applied where three or more different types of materials are to be used, e.g., having different levels of durability and/or water absorbency, or materials having three or more different colorization or design patterns.

Additional variations are possible on the embodiments described above. For instance, as noted above, because the softer material generally will be less puncture-resistant than the more durable material, it is preferable to keep the spacing between the softer and more durable materials small. However, if larger areas of the softer material are desired, a layer of puncture-resistant material (e.g., Kevlar) may be disposed between the softer material and the wearer's foot. This can result in a lightweight safety or military shoe without the necessity of using a heavy steel or metal plate on the bottom of such a shoe.

As indicated above, material 52 preferably is softer and material 54 is more durable. For these purposes, material 52 may comprise materials other than fabric, such as paper, other plant material formed into sheets (e.g., in a similar manner to paper), cork, woven or non-woven sheets formed from non-fabric plant fibers (e.g., jute), natural or synthetic foam material, silicone, Styrofoam, plastic or any of a variety of other materials. Also, it is not necessary that material 52 be softer than the base material 54 that is used to form the shoe outsole. For example, material 52 may instead comprise wood, leather, reconstituted leather (e.g., dried, ground into small particles, and then used to form sheet material), a composite material, glass, any of a variety of different types of metal (e.g., steel or aluminum), or any other type of material. In any event, natural and/or organic materials generally are preferred.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality may be ascribed to a particular module or component. However, unless any particular functionality is described above as being critical to the referenced module or component, functionality may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A shoe, comprising:
   (a) a bottom portion, comprised of a second material, that includes a sole portion and a heel portion and that has a bottom surface with an insert embedded within it; and
   (b) an upper portion extending upwardly from the bottom portion,
   wherein the embedded insert is made of a first material and includes a plurality of holes filled with the second material, such that the bottom surface of the bottom portion of the shoe has areas of the first material interspersed with areas of the second material,
   wherein the first material covers at least 50% of that portion of the bottom surface that contacts the ground in normal use, and wherein the first material is comprised of at least one of leather, perforated cloth, perforated natural animal skin, cork, jute, wood or paper.

2. A shoe according to claim 1, wherein the second material is comprised of a synthetic rubber.

3. A shoe according to claim 1, wherein the first material and the second material alternate at least 4 times when traversing a straight line across the bottom surface of the shoe.

4. A shoe according to claim 3, wherein center-to-center spacing between the areas of the first material and the areas of the second material is less than 5 millimeters but greater than 0.2 millimeter.

5. A shoe according to claim 3, wherein center-to-center spacing between the first material and the second material in the area is less than 3 millimeters but greater than 0.2 millimeter.

6. A shoe according to claim 1, wherein the first material is comprised of leather.

7. A shoe according to claim 1, wherein the embedded insert is surrounded by the second material.

8. A shoe according to claim 1, further comprising a second embedded insert made of the first material.

9. A shoe according to claim 8, wherein the second embedded insert also has holes filled with the second material.

10. A shoe according to claim 8, wherein the second embedded insert does not include holes.

11. A shoe according to claim 8, wherein each of the embedded insert and the second embedded insert is surrounded by the second material.

12. A shoe according to claim 1, wherein the embedded insert has been molded into the bottom surface.

13. A shoe according to claim 1, wherein the embedded insert has been glued into an indentation in the bottom surface.

14. A shoe according to claim 13, wherein the thickness of the embedded insert is approximately the same as the depth of the indentation.

15. A shoe according to claim 1, wherein the first material and the second material alternate at least 8 times when traversing a straight line across the bottom surface of the shoe.

16. A shoe according to claim 1, wherein the first material is comprised of a plant material.

17. A shoe according to claim 16, wherein the first material has been formed from plant fibers.

18. A shoe according to claim 1, wherein the embedded insert is a piece of perforated cloth.

19. A shoe according to claim 1, wherein the embedded insert is a piece of perforated natural animal skin.

20. A shoe according to claim 1, wherein the embedded insert is a piece of perforated sheet material.

21. A shoe according to claim 1, wherein the embedded insert extends, in depth, substantially through a usable portion of the bottom portion of the shoe.

22. A shoe according to claim 1, wherein the first material comprises at least one of cork, jute, wood or paper.

* * * * *